United States Patent
Stavnes et al.

(10) Patent No.: US 6,777,043 B2
(45) Date of Patent: Aug. 17, 2004

(54) FUSE TUBE AND METHOD OF MANUFACTURE THEREOF

(75) Inventors: Mark W. Stavnes, Lake Zurich, IL (US); Jeffrey A. Moore, Lake Zurich, IL (US); Thomas J. Tobin, Northbrook, IL (US)

(73) Assignee: S & C Electric Co., Chicago, IL (US)

( * ) Notice: Subject to any disclaimer, the term of this patent is extended or adjusted under 35 U.S.C. 154(b) by 0 days.

(21) Appl. No.: 09/054,986

(22) Filed: Apr. 3, 1998

(65) Prior Publication Data

US 2002/0041944 A1 Apr. 11, 2002

(51) Int. Cl.[7] ............................................. H01H 85/08
(52) U.S. Cl. ...................... 428/34.2; 156/169; 156/173; 156/175; 428/36.3; 428/36.4; 428/36.9; 428/365
(58) Field of Search ............................ 428/34.2, 36.3, 428/36.4, 36.9, 365; 156/169, 173, 175; 138/158, 168, 124, 140, 130, 174, 177

(56) References Cited

U.S. PATENT DOCUMENTS

| | | | | |
|---|---|---|---|---|
| 4,313,100 A | * | 1/1982 | Schmunk | 337/168 |
| 4,349,803 A | * | 9/1982 | Tobin | 337/186 |
| 4,713,645 A | * | 12/1987 | Razavi | 337/246 |
| 5,015,514 A | * | 5/1991 | Rinehart | 428/36.4 |
| 5,975,145 A | * | 11/1999 | Brown et al. | 138/140 |

* cited by examiner

*Primary Examiner*—Sandra M. Nolan
(74) *Attorney, Agent, or Firm*—James V. Lapacek

(57) ABSTRACT

An arc-quenching composition is provided including a filler, a fiber and a binder. Preferably, the filler includes an arc-quenching compound such as melamine. The binder includes a thermosetting resin to facilitate forming of the arc-quenching composition into an arc-quenching fuse tube. In a preferred arrangement, an outer tube is formed over the arc-quenching fuse tube to provide an overall high-strength fuse tube. Also in a preferred arrangement, in order to provide a fuse tube that is capable of operation over an extremely wide current range, the inner arc-quenching tube includes a tapered bore. According to one fabrication technique, the outer tube is formed over the arc-quenching inner tube before the curing of the inner tube such that a single structure results.

2 Claims, 2 Drawing Sheets

FUSE TUBE AND METHOD OF MANUFACTURE THEREOF

BACKGROUND OF THE INVENTION

1. Field of the Invention

The present invention relates generally to arc-quenching compositions and articles formed therefrom and more particularly to a fuse tube construction which is easily manufactured utilizing inexpensive materials and that exhibits excellent strength and arc-quenching properties for operation over a wide range of currents.

2. Description of the Related Art

Fuse tubes for medium and high-voltage electrical fuses wherein circuit interruption takes place within the fuse tube requires high strength and arc-quenching properties. Examples of prior art fuse tubes are found in U.S. Pat. Nos. 3,911,385, 3,979,709, 3,984,800, 4,313,100, 4,349,803, 4,373,555, 4,373,556, 4,564,830, 4,808,963, 5,015,514 and 5,119,060. Fuse tubes for operation to interrupt currents over a wide range, e.g. 100–10,000 amperes, require especially high strength and arc-quenching properties that are difficult to obtain. In conventional fuse cutouts utilized in electrical power distribution systems, the fuse tube is fabricated by winding a filament-wound glass-epoxy outer tube over an inner tube of vulcanized fiber that provides the arc-quenching properties. Various alternatives have been proposed to fabricate fuse tubes with overall high strength and a bore of suitable arc-quenching properties. Some of these alternatives include various fabrication techniques utilizing fiber supported in epoxy resin mixtures to provide an inner layer having arc-quenching properties over which is formed an outer layer providing strength. In the aforementioned U.S. Pat. Nos. 4,373,555 and 4,373,556, the inner arc-quenching layer of the fuse tube is fabricated from polyester fiber and epoxy resin mixture. In U.S. Pat. No. 5,015,514, approximately 55–60% aluminum trihydrate is included by weight in an inner arc-quenching layer along with organic fiber and epoxy resin. In the aforementioned U.S. Pat. No. 4,349,803, a molded tube includes a layer of porous fiberglass cloth with an inner layer of thermosetting material having an arc-quenching material therein and an outer weather resistant portion being formed about the intermediate porous fiberglass cloth.

While the prior art arrangements may be generally useful to provide fuse tubes for electrical fuses, the prior arrangements involve either relatively expensive natural resources or complex processing and fabrication. Further, most do not provide a fuse tube which is capable of withstanding the pressures of high-current interruptions and also being capable of interrupting low current faults.

SUMMARY OF THE INVENTION

Accordingly, it is a principal object of the present invention to provide an arc-quenching composition that is useful for forming articles thereof and particularly the inner arc-quenching layer of a high-strength layered fuse tube.

It is another object of the present invention to provide a fuse tube for electrical fuses that exhibits excellent strength and arc-quenching characteristics while also being easily fabricated from resins, fiber and fillers.

It is a further object of the present invention to provide a fuse tube which is fabricated by forming an inner tube having a bore with arc-quenching properties and before the curing of the inner tube forming an outer tube over the inner tube such that the inner and outer tubes cure as a single structure and avoid any dielectric joint or interface therebetween.

It is yet another object of the present invention to provide an arc-quenching bore for a fuse tube that is capable of interrupting a wide range of currents via the combination of an arc-quenching compound in the bore and a predetermined taper in the bore.

These and other objects of the present invention are efficiently achieved by the provision of an arc-quenching composition including a filler, a fiber and a binder. Preferably, the filler includes an arc-quenching compound such as melamine. The binder includes a thermosetting resin to facilitate forming of the arc-quenching composition into an arc-quenching fuse tube. In a preferred arrangement, an outer tube is formed over the arc-quenching fuse tube to provide an overall high-strength fuse tube. Also in a preferred arrangement, in order to provide a fuse tube that is capable of operation over an extremely wide current range, the inner arc-quenching tube includes a tapered bore. According to one fabrication technique, the outer tube is formed over the arc-quenching inner tube before the curing of the inner tube such that a single structure results.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
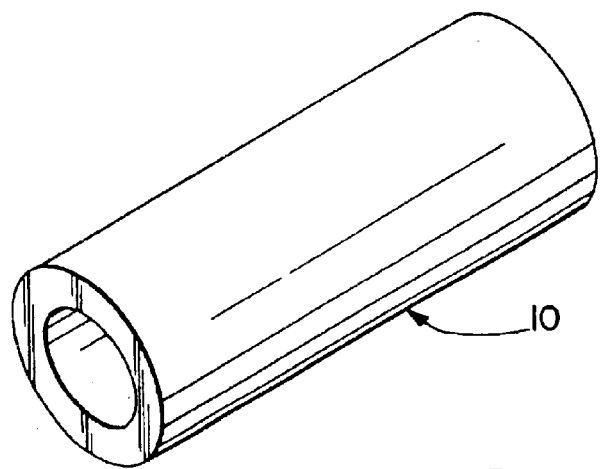
FIG. 1 is a perspective view of an arc-quenching tube in accordance with the present invention.

It has been found that an arc-quenching composition can be unexpectedly utilized to form an inner layer of a fuse tube, e.g. via filament winding, injection molding, or an extrusion process such as pultrusion, while exhibiting improved arc-quenching properties, the arc-quenching composition including a fiber, a filler, and a binder such as a thermosetting resin. The filler preferably includes an arc-quenching compound such as melamine. Additional fillers are also included in specific embodiments. The arc-quenching compound can also be characterized as an arc-quenching material or mixture. While a fuse tube of this fabrication may be suitable for some purposes, for the fabrication of high-strength fuse tubes which are required to also provide suitable arc-quenching bore characteristics for a wide range of arcing currents initiated therein, it has unexpectedly been found possible to provide such a high-strength tube by providing a high-strength fiber-reinforced layer over an inner layer of the arc-quenching composition. For fuse tubes which are required to provide an extremely wide range of arc-quenching properties including extremely high currents at medium voltages, the inner arc-quenching layer is provided with a taper so as to be larger at the exhaust opening of the fuse tube to alleviate stagnation of gases evolved within the bore arising from a high rate of gas generation at the extremely high currents. In a preferred embodiment, the mild taper is provided by a stepped counterbore structure.

While articles in accordance with the present invention can be fabricated utilizing a variety of conventional extrusion, winding, injection molding and other processes, in a preferred form of the invention, fuse tubes are fabricated via a filament winding process. In accordance with important aspects of the present invention, to achieve high-strength fuse tubes, a layered filament winding process is utilized wherein a high-strength layer is wound over an inner arc-quenching layer or tube. Alternatively, the inner arc-quenching layer is fabricated by filament winding and the outer layer is molded over the inner arc-quenching layer. In other embodiments, the inner arc-quenching layer is formed via injection molding or pultrusion, and the outer layer is formed thereon either via filament winding or an overmolding process. In the arrangements where the inner arc-quenching layer is formed via an injection molding or extrusion process, the fiber is in the form of chopped, short fibers rather than a filament form which is suitable for fabrication via winding.

To achieve the optimum in arc-quenching performance over a wide range of currents including high currents, the bore of the inner arc-quenching layer is tapered or counterbored in steps to alleviate gas stagnation at high currents. In this regard and in accordance with important aspects of the present invention, the arc-quenching layer has a predetermined uniformity of distribution of the fiber and a mixture of the filler and binder such that the outer surface of the arc-quenching layer is provided with a predetermined uniformity to permit maximum tapering into the bore of the arc-quenching layer, i.e. minimizing the thickness of the layer and utilizing the maximum extent thereof without exposing the bore to the outer high-strength layer or increasing the thickness of the inner layer. Any unnecessary increase in the diameter of the arc-quenching layer is undesirable since the overall strength of the fuse tube is reduced thereby. The taper is formed either during fabrication or thereafter by machining. Similarly, the outer layer also has a predetermined uniformity of distribution to achieve desirable uniformity.

In accordance with other important aspects of the present invention, the relationship between the arc quenching compound and the amount of the taper in the bore provides optimum performance over a wide current range. It has been found that a general relationship exists between the amount of arc quenching compound and the degree of bore tapering such that low current performance is improved and the low current range is extended by a relatively higher percentage of arc-quenching compound while high current performance is improved and the high current range is extended by increasing the amount of bore tapering. That is, a sufficient amount of arc quenching compound is required with a given binder and fiber in order to achieve low current performance such that sufficient quenching gases are generated. Also when sufficient amounts of arc quenching material are present in the arc-quenching layer, the maximum high current performance is achieved by providing relatively larger tapering of the bore so that high amounts of generated gases at the high currents do not cause stagnation. With the arc-quenching characteristics established by the inner arc quenching layer, the outer layer or layers of the fuse tube are formulated to achieve high-strength of the overall fuse tube. For example the outer layer in a preferred embodiment utilizes a high strength fiber such as fiberglass supported in epoxy resin to achieve high-strength.

Considering now the fabrication of an illustrative embodiment of the present invention to provide a high strength fuse tube with an arc-quenching bore to interrupt currents over a wide current range, e.g. 100 amperes to 10,000 amperes, a curing agent, a filler including an arc-quenching compound, a thermosetting resin, and an accelerator are suitably combined and mixed. In this mixture, which may also be characterized as a matrix, where melamine is used for the arc-quenching compound, the composition by weight of the melamine is in the approximate range of 10–30% depending on the particular properties to be achieved, as will be explained in more detail hereinafter. The fiber, in the form of a filament or strand, is then drawn through the mixture and then wound around a mandrel coated with a mold release agent, with one or more winding passes being made to accomplish an inner layer of predetermined thickness. The payout of the fiber and the winding speed are arranged such that the individual fiber strands lay flat and do not overlap on the mandrel during each winding pass of the inner layer. Also, the winding tension is arranged to achieve a desirable relationship between mixture and fiber in the wound inner layer. The inner arc-quenching layer is wound to be oversized relative to the final desired diameter to allow for compression due to the tension of the winding of the outer layer. The outer layer is then immediately applied over the wound inner, arc-quenching layer, again one or more winding passes being made to achieve an outer layer of predetermined thickness. The winding tension is arranged such that the inner layer is not compressed too much so as to squeeze out too much mixture. However, sufficient tension is utilized such that the inner layer is not oversized which could result in reduced strength of the overall fuse tube. The fuse tube is then heat cured, e.g. at approximately 300 degrees F. In a preferred embodiment to provide a suitable high-strength fuse tube for a wide range of current interruption, the inner layer as fabricated includes a composition by weight of approximately 25% fiber, approximately 20% melamine, and approximately 55% thermosetting resin with curing agent. The fuse tube in specific embodiments is provided with a tapered bore, either via the winding process or after curing via suitable machining, e.g. counterboring or the like.

In an illustrative embodiment of the inner tube, the fiber is an organic fiber such as acrylic yarn. Other suitable fibers include polyester, nylon, rayon, cotton, cellulose and mixtures thereof. The fiber for the inner tube is preferably in the form of yarn, cloth, veils or tapes rather than particles or individual fibrous material. Considering an illustrative embodiment, the arc-quenching compound is melamine. Other suitable compounds include fluorine containing polymers like Teflon, boric acid, aluminum trihydrate, magnesium hydroxide, silicones, polyesters, polyurethanes, zinc borate, benzoguanamine, dithioammelide, ammeline, and a cyanuric halide and mixtures thereof. Additionally considering an illustrative embodiment, the thermosetting resin is bisphenol-A epoxy resin while suitable thermosetting resins include cycloaliphatic epoxy resin or mixtures of bisphenol-A and cycloaliphatic epoxy resins, phenolics, polyurethanes, polyesters, silicones, or urea-formaldehydes. However, it has been found expedient to avoid any structural problems by using bisphenol-A epoxy resin for both the inner and outer layers. In a specific embodiment, BDMA has been found to be a suitable accelerator agent and Lindride 32 has been found to be a suitable anhydride curing agent. A suspension aid, such as Bentone, has also been found useful to avoid any settling problems in the mixture of the resin and arc-quenching compound. While not required for the practice of the present invention to achieve the desired arc-quenching properties and strength of the fuse tube, additional fillers may also be utilized in specific embodiments, e.g. silica, hydrated alumina, aluminum fluoride, bentonite, that either augment or do not affect the properties obtained by the combination of the fiber, the arc-quenching compound and the thermosetting resin.

Figure 2:
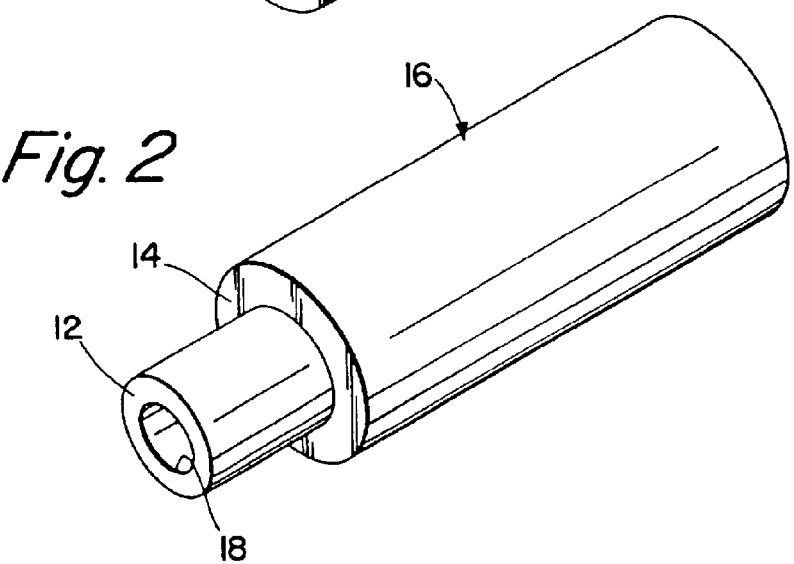
FIG. 2 is a perspective view of a layered fuse tube in accordance with the present invention.

With reference to FIG. 1, a fuse tube 10 in accordance with the present invention is formed as an elongated tubular body, e.g. via winding, molding or extrusion, for use as a fuse tube or as an arc-quenching liner. Referring now to FIG. 2, a fuse tube 16 in the form of an elongated tubular body includes an inner tube 12 and an outer tube 14. The inner tube 12 is fabricated with a central bore 18 and from the arc-quenching composition to provide desired arc-quenching properties. The outer tube 14 is then formed about the inner tube 12, e.g. via winding or molding, to provide additional strength to the fuse tube 16. The material of the inner tube 12 is a thermosetting resin with suitable arc-quenching fillers and fiber content to allow fabrication in a winding, molding or extrusion process, e.g. such that the material has suitable viscosity and workability. Essentially immediately thereafter, or preferably before the inner tube 12 cures, the outer tube 14 is formed about the inner tube 12 such that any dielectric or mechanical interface is avoided and the materials of the inner and outer tubes 12, 14 bond or cross link at their interface. In one example, the outer tube 14 is fabricated by filament winding of a thermosetting resin including suitable fiber content such as fiberglass to achieve the desired structural strength.

In one illustrative embodiment, the inner tube 12 and the outer tube 14 are wound essentially simultaneously, i.e. concurrently, in tandem or sequentially, on a continuous filament winding machine. In other illustrative embodiments, the inner tube 12 is extruded or molded and the outer tube 14 is wound or molded over the inner tube 12 preferably such that both tubes cure as a single structure. The materials of the inner and outer tubes 12, 14 are selected such that they cure as a single structure via bonding and/or crosslinking. This eliminates any dielectric or mechanical interfaces or boundaries between the tubes 12, 14 and ensures that the inner and outer tubes 12, 14 remain an integral mechanical structure and are highly resistant to any separation, e.g. "push-out" forces to which the inner and outer tubes 12, 14 are subjected during the interruption of electrical arcs.

Figure 3:
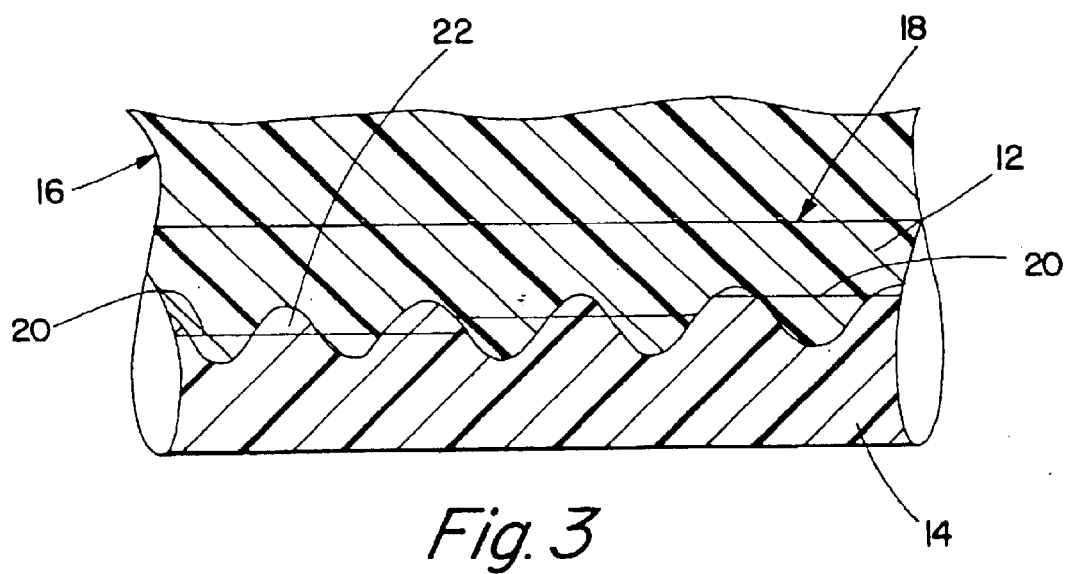
FIGS. 3 and 4 are enlarged views of a section of the wall of the fuse tube of FIGS. 1 and 2.
Figure 4:
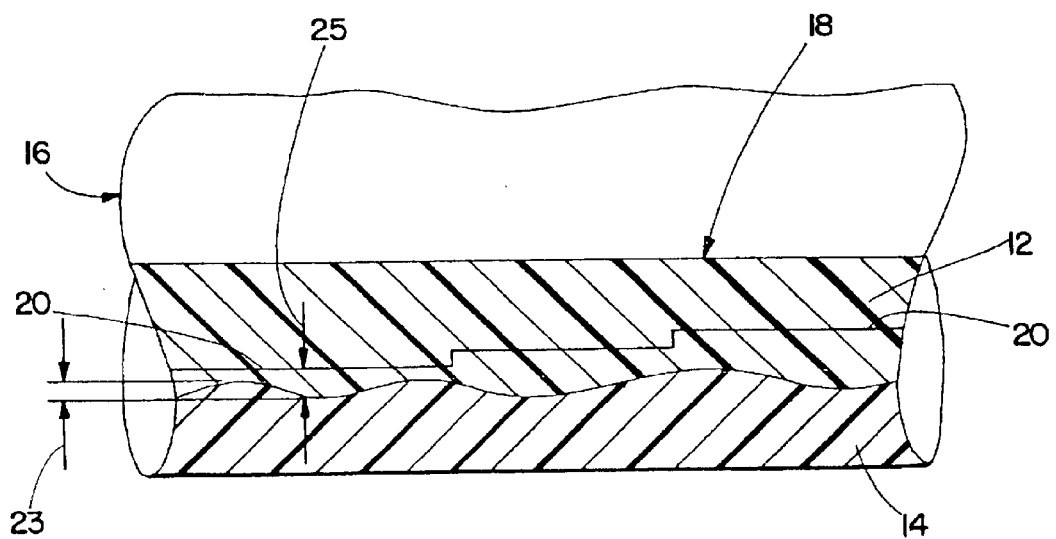

With additional reference now to FIG. 3, if suitable uniformity in the winding of the inner tube 12 is not achieved relative to the amount of bore taper (e.g. due to overlapping of the winding strands such that the individual fiber strands do not lay flat), when the arc-quenching composition of the bore 18 is removed to provide the bore taper as illustrated by the line 20, this actually extends beyond the inner tube 12 and into the outer tube 14 exposing the tapered bore 20 to the material of the outer tube 14 as illustrated at 22. This, of course, is extremely undesirable in a fuse tube application where the bore is required to have arc-quenching properties. With additional reference now to FIG. 4, if the inner arc-quenching tube 12 achieves the predetermined uniformity as illustrated, then the bore taper with removal of material at 20 does not expose the tapered bore 20 to the material of the outer tube 14, but instead is entirely within the inner arc-quenching layer of the inner tube 12. For example, this attribute can be characterized as the non-uniformity or variation referred to at 23 being sufficiently small so as not to affect the minimum wall thickness referred to at 25, i.e. such that the non-uniformity does not significantly impact or interfere with the desired wall thickness of the tapered bore 20. Of course, the significance in particular applications depends on the amount the wall thickness at 25 is expected to be eroded or ablated during arc-quenching and over the expected use of the inner tube 12. In a specific illustration, this could be described as the non-uniformity or variation referred to at 23 being significantly less than the minimum wall thickness referred to at 25. Further, the uniformity of the outer tube 14 is also important so as to minimize any machining of the outer surface to obtain a suitable surface and also to maximize strength.

In a specific illustrative embodiment, the bore 18 of the fuse tube 16 is 0.50 of an inch, the final outer diameter of the inner tube 12 is 0.72 of an inch, and the outer diameter of the fuse tube 16 is 1.0 inch. For application with nominal voltage ratings in the range of 7.2 to 25 kv, the length of the fuse tube 16 is in the range of 9–16 inches.

Figure 5:
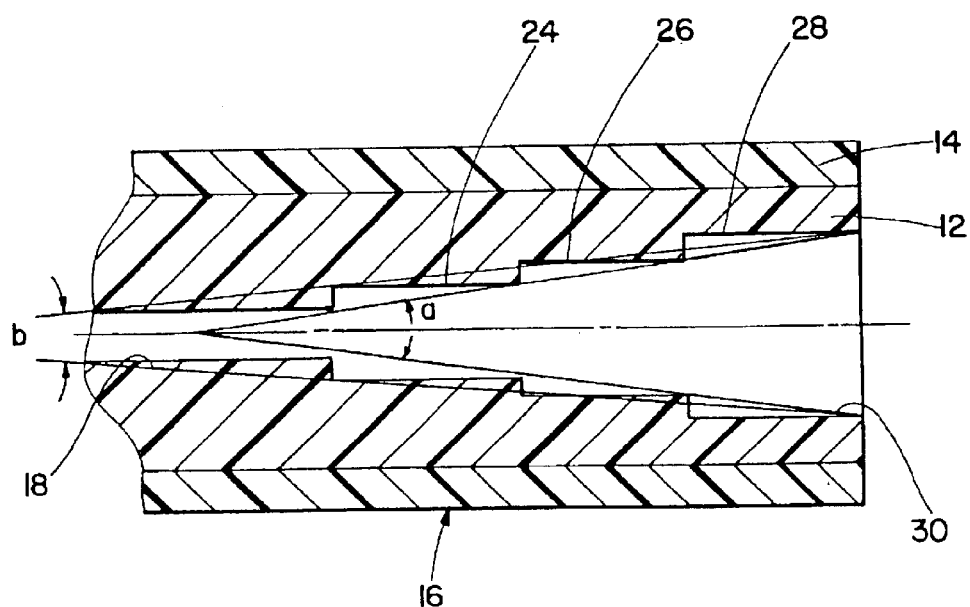
FIG. 5 is an enlarged sectional view of a preferred embodiment of the fuse tube of FIGS. 1 and 2 illustrating the taper in the bore of the fuse tube.

Considering now the tapered bore in more detail and with additional reference to FIG. 5, the taper of the bore is illustrated on an enlarged scale and the proportions have been greatly exaggerated for illustrative purposes. For example, for a fuse having a nominal voltage rating of 25 kv and a 12000 RMS asymmetrical ampere maximum current interrupting rating, five steps of taper are utilized as described in more detail in the aforementioned U.S. Pat. No. 4,313,100 which increase the bore opening from 0.500 of an inch to 0.656 of an inch over a length of 3.5 inches. Further, for a fuse having a nominal voltage rating of 25 kv and a 8000 RMS asymmetrical ampere maximum current interrupting rating, five steps of taper are utilized as described in more detail in the aforementioned U.S. Pat. No. 4,313,100 which increase the bore opening from 0.500 of an inch to 0.656 of an inch over a length of 5.5 inches. Specifically, in FIG. 5, three bore steps 24, 26 and 28 are illustrated which enlarge the bore opening 18 of the fuse tube 16 so as to define included angles "a" and "b" which range from 1–3 degrees in accordance with the dimensions herein above, the angle "a" being defined between the opening of the bore 20 at the exhaust end 30 and the innermost portion of the step 24, while the angle "b" is defined between the opening of the bore 20 at the exhaust end 30 and the outermost portion of the step 24.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed and desired to be secured by Letters Patent of the United States is:

1. Covers a method of making an arc-quenching tube comprising the steps:

winding the tube such that the first fiber layer lays flat and does not overlap in each of the one+ winding passes used to make the tube so that a predetermined suitable uniformity of thickness is achieved, and forming a predetermined taper within the tube wherein the taper defines the desired minimum wall thickness of the tube, wherein the taper defines the minimum wall thickness of the tube and the uniformity is such that variations in the thickness of the tube are significantly less than the desired minimum wall thickness so as not to significantly impact on or interfere with the desired minimum wall thickness defined by the predetermined taper.

2. The method of claim 1 further comprising the winding of a second fiber in one or more winding passes over the first fiber, the second fiber being different from the first fiber, the method further comprising winding such that the second fiber lays flat and does not overlap in each of the one or more winding passes whereby uniformity is achieved in the thickness of the tube.

* * * * *

UNITED STATES PATENT AND TRADEMARK OFFICE
CERTIFICATE OF CORRECTION

PATENT NO.      : 6,777,043 B2
DATED           : August 17, 2004
INVENTOR(S)     : M. Stavnes et al.

It is certified that error appears in the above-identified patent and that said Letters Patent is hereby corrected as shown below:

Column 6,
Lines 51-65, should read:

1. A method of fabricating an arc-quenching tube via the winding of a first fiber in one or more winding passes and the subsequent forming of a predetermined taper within the arc-quenching tube wherein the predetermined taper defines the desired minimum wall thickness of the tube, the arc-quenching tube having a desired minimum wall thickness after fabricating so as to provide the expected arc-quenching over the expected use of the arc-quenching tube, the method comprising winding the arc-quenching tube such that the first fiber lays flat and does not overlap in each of the one or more winding passes whereby a predetermined suitable uniformity is achieved in the thickness of the tube, the method further comprising forming a predetermined taper within the arc-quenching tube wherein the predetermined taper defines the desired minimum wall thickness of the tube, the predetermined suitable uniformity being such that variations in the thickness of the tube are significantly less than the desired minimum wall thickness so as not to significantly impact or interfere with the desired minimum wall thickness defined by the predetermined taper.

Signed and Sealed this

Twenty-eighth Day of June, 2005

JON W. DUDAS
*Director of the United States Patent and Trademark Office*